United States Patent
Saito et al.

(10) Patent No.: US 7,947,242 B2
(45) Date of Patent: May 24, 2011

(54) CEMENT KILN CHLORINE/SULFUR BYPASS SYSTEM

(75) Inventors: Shinichiro Saito, Kumagaya (JP); Naoki Ueno, Funabashi (JP); Hiroshi Harada, Chichibu (JP); Soichiro Okamura, Osato-gun (JP); Takayuki Suzuki, Funabashi (JP)

(73) Assignee: Taiheiyo Cement Corporation, Tokyo (JP)

( * ) Notice: Subject to any disclaimer, the term of this patent is extended or adjusted under 35 U.S.C. 154(b) by 1134 days.

(21) Appl. No.: 10/537,528

(22) PCT Filed: Aug. 13, 2003

(86) PCT No.: PCT/JP03/10278
§ 371 (c)(1),
(2), (4) Date: Aug. 22, 2006

(87) PCT Pub. No.: WO2004/052801
PCT Pub. Date: Jun. 24, 2004

(65) Prior Publication Data
US 2007/0098035 A1   May 3, 2007

(30) Foreign Application Priority Data
Dec. 11, 2002   (JP) ................. 2002-359440

(51) Int. Cl.
*B01D 53/56*   (2006.01)
(52) U.S. Cl. ........... 423/242.1; 423/243.01; 423/243.08; 423/244.01; 423/244.07; 106/751; 106/761; 106/762; 95/235; 96/376; 432/14; 432/72; 432/103
(58) Field of Classification Search .......... 96/278, 96/366, 371, 236, 237, 238, 373, 376; 373/8; 106/751, 761, 762; 588/3; 55/474, 476; 95/219, 235; 423/242.1, 243.01, 243.08, 244.01, 244.07; 432/14, 66, 72, 103–109
See application file for complete search history.

(56) References Cited

U.S. PATENT DOCUMENTS 2,760,635 A * 8/1956 Dahlstrom ............... 426/484
3,638,400 A * 2/1972 Heilmann .................. 95/73
(Continued)

FOREIGN PATENT DOCUMENTS
DE   4442563 A1   6/1999
(Continued)

*Primary Examiner* — Duane Smith
*Assistant Examiner* — Thomas McKenzie
(74) *Attorney, Agent, or Firm* — Stetina Brunda Garred & Brucker

(57) ABSTRACT

A cement kiln chlorine/sulfur bypass system wherein the equipment cost is suppressed and the sulfur included in a combustion gas bled from a cement kiln is separated and effectively utilized. The cement kiln chlorine/sulfur bypass system comprises an air bleed means for bleeding a kiln exhaust gas passage, which runs from the end of the cement kiln to a bottom cyclone, of a part of the combustion gas, a separating means for separating dust in the gas bled by the air bleed means into coarse particles and fine particles, and a wet dust collector for collecting dust from the gas containing the fine particles separated by the separating means. The separating means is preferably a classifier in which the cut size is changeable. The wet dust collector is preferably a mixing scrubber. The mixing scrubber preferably comprises a circulating liquid tank to which dust slurry collected by the mixing scrubber is supplied and a circulating system by which a part of the dust slurry in the circulating liquid tank is returned to the mixing scrubber.

13 Claims, 3 Drawing Sheets

U.S. PATENT DOCUMENTS

| | | | |
|---|---|---|---|
| 3,692,287 A * | 9/1972 | Kohl et al. | 106/751 |
| 3,716,387 A * | 2/1973 | Simmons et al. | 106/750 |
| 4,031,184 A * | 6/1977 | McCord | 423/197 |
| 4,052,042 A * | 10/1977 | Hegemann et al. | 266/89 |
| 4,093,426 A * | 6/1978 | Cantalapiedra Benjumea | 95/66 |
| 4,126,000 A * | 11/1978 | Funk | 60/648 |
| 4,133,658 A * | 1/1979 | Callewyn | 55/315 |
| 4,184,886 A * | 1/1980 | Ellingen et al. | 106/746 |
| 4,220,476 A * | 9/1980 | Touborg | 106/751 |
| 4,276,272 A * | 6/1981 | Schlager et al. | 423/244.07 |
| 4,277,450 A * | 7/1981 | Dilworth | 423/244.08 |
| 4,332,777 A * | 6/1982 | Pazdej | 423/98 |
| 4,465,460 A * | 8/1984 | Cosar | 432/106 |
| 4,469,664 A * | 9/1984 | Abelitis et al. | 423/244.07 |
| 4,472,181 A * | 9/1984 | Herrlander | 96/235 |
| 4,540,555 A * | 9/1985 | Franke et al. | 423/243.01 |
| 4,634,583 A * | 1/1987 | Wolter et al. | 423/244.07 |
| 4,715,811 A * | 12/1987 | Lawall | 432/58 |
| 4,854,946 A * | 8/1989 | Heijwegen et al. | 95/197 |
| 4,915,914 A * | 4/1990 | Morrison | 422/168 |
| 4,931,264 A * | 6/1990 | Rochelle et al. | 423/244.01 |
| 5,100,643 A * | 3/1992 | Brna et al. | 423/240 R |
| 5,259,876 A | 11/1993 | Enkegaard | |
| 5,264,013 A * | 11/1993 | Brentrup | 95/128 |
| 5,620,667 A * | 4/1997 | Nemoto et al. | 422/171 |
| 5,667,582 A * | 9/1997 | Ziegler et al. | 106/761 |
| 5,927,967 A * | 7/1999 | Bauer et al. | 432/72 |
| 5,937,771 A * | 8/1999 | Sutoh et al. | 110/345 |
| 5,958,094 A * | 9/1999 | Schwamborn et al. | 55/331 |
| 6,017,213 A * | 1/2000 | Murata et al. | 432/116 |
| 6,068,822 A * | 5/2000 | Kotake et al. | 423/220 |
| 6,149,713 A * | 11/2000 | Ochi et al. | 95/28 |
| 6,325,620 B1 * | 12/2001 | Heinemann | 432/16 |
| 6,461,153 B2 * | 10/2002 | Eckert et al. | 432/14 |
| 6,902,714 B2 * | 6/2005 | Skaarup Jensen et al. | 423/244.09 |
| 2002/0009403 A1 * | 1/2002 | Shimizu et al. | 423/215.5 |
| 2002/0071801 A1 * | 6/2002 | Eckert et al. | 423/244.07 |
| 2002/0085961 A1 * | 7/2002 | Morin et al. | 422/171 |
| 2002/0168311 A1 * | 11/2002 | Takashina et al. | 423/243.08 |
| 2003/0175193 A1 * | 9/2003 | Schultz et al. | 423/243.08 |
| 2004/0173096 A1 * | 9/2004 | Terasaki et al. | 95/271 |
| 2006/0199134 A1 * | 9/2006 | Ness et al. | 432/121 |
| 2007/0086930 A1 * | 4/2007 | Saito | 422/168 |
| 2007/0098035 A1 * | 5/2007 | Shinichiro et al. | 373/8 |
| 2008/0092735 A1 * | 4/2008 | Saito et al. | 95/39 |
| 2008/0092739 A1 * | 4/2008 | Saito et al. | 95/288 |
| 2009/0169453 A1 * | 7/2009 | Saito et al. | 423/235 |
| 2010/0000119 A1 * | 1/2010 | Ueno et al. | 34/493 |
| 2010/0032385 A1 * | 2/2010 | Ueno et al. | 210/771 |

FOREIGN PATENT DOCUMENTS

| | | |
|---|---|---|
| EP | 0455301 A1 | 11/1991 |
| EP | 1048629 A1 | 11/2000 |
| EP | 1574487 * | 9/2005 |
| JP | 2116649 U | 9/1990 |
| JP | 06063335 | 8/1994 |
| JP | 9175847 | 7/1997 |
| JP | 09295841 | 11/1997 |
| JP | 11035354 A | 2/1999 |
| JP | 11100243 | 4/1999 |
| JP | 11100243 A | 4/1999 |
| JP | 11130489 A | 5/1999 |
| JP | 2000146458 | 5/2000 |
| JP | 2000146458 A | 5/2000 |
| JP | 2002172314 A | 6/2002 |
| JP | 2002338312 A | 11/2002 |

* cited by examiner

CEMENT KILN CHLORINE/SULFUR BYPASS SYSTEM

FIELD OF THE INVENTION

The present invention relates a cement kiln chlorine/sulfur bypass system, and more particularly to a cement kiln chlorine/sulfur bypass system that bleeds a kiln exhaust gas passage, which runs from the end of the cement kiln to a bottom cyclone, of a part of the combustion gas to remove chlorine and sulfur.

BACKGROUND ART

It is noticed that chlorine, sulfur, alkali and the like cause troubles such as preheater clogging in cement plants, and especially chlorine exerts the most harmful effect, so that a cement kiln chlorine/sulfur bypass system that bleeds a kiln exhaust gas passage, which runs from the end of a cement kiln to a bottom cyclone, of a part of the combustion gas to remove chlorine is used.

In this cement kiln chlorine/sulfur bypass system, as exemplarily described in World Patent Publication WO97/21 pamphlet, chlorine is more distributed on fine particle side of the dust, which is generated by cooling the bled exhaust gas, so that the dust is separated into coarse particles and fine particles by a classifier; the coarse particles are returned to the cement kiln system; and the fine particles (chlorine bypass dust) containing separated potassium chloride (KCl) and the like is recovered to be added to a cement grinding mill system.

However, in recent years, recycling of waste through conversion to cement raw material or fuel is promoted, which increases the quantity of volatile components, such as chlorine, sulfur, alkali and the like, brought to the cement kiln, as the quantity of the treated waste increases, which increases the quantity of the chlorine bypass dust generated. As a result, all of the chlorine bypass dust cannot be utilized in the cement grinding process, and salt that is not utilized is discharged after water treatment. However, it is expected that the quantity of the chlorine bypass dust will further increase in future, development of a new processing method is desired.

From the above-mentioned point of view, as described in Japanese Patent Publication Heisei 11-100243 gazette, in order to desalt chlorine bypass dust and the like conventionally subjected to water treatment and effectively utilize the desalted matter as cement raw material, water is added to a waste containing chlorine to elute chlorine; and the resulting material is filtered; and desalted cake is utilized as cement raw material; and drainage is purified and is discharged without causing environmental pollution to treat the chlorine bypass dust.

However, in the conversion treatment of waste into cement raw material described in the above Japanese Patent Publication Heisei 11-100243 gazette, in order to desalt chlorine bypass dust and the like, a cooler (heat exchanger) and a hot bag filter are used to recover the chlorine bypass dust, but the chlorine bypass dust contains salt, so that the cooler and the like are easily corroded, which shortens the life of the equipment, in addition, a large-scale tank and fixed-quantity feeders are required to storage a large amount of dust, of which specific gravity is considerably low and which is difficult to handle, which causes a problem that equipment cost increases.

Further, at the above chlorine bypass, a part of combustion gas bled from the cement kiln at a portion near the inlet hood thereof contains sulfur, so that the bled gas cannot be discharged to outside as it is, and the gas is required to be returned to a raw material drying process, raw material grinding process, or the like.

DISCLOSURE OF THE INVENTION

The present invention has been made in consideration of the problems in the above conventional method of treating combustion gas exhausted from a cement kiln, and it is therefore the object of the present invention to provide a cement kiln chlorine/sulfur bypass system in which the equipment cost is suppressed and the sulfur content included in a combustion gas bled from a cement kiln is separated to discharge the gas to the atmosphere, and so on.

To achieve the above object, the present invention relates to a cement kiln chlorine/sulfur bypass system, which is characterized in that the system comprises: an air bleed means for bleeding a kiln exhaust gas passage, which runs from an end of a cement kiln to a bottom cyclone, of a part of a combustion gas; a separating means for separating dust in the gas bled by the air bleed means into coarse particles and fine particles; and a wet dust collector for collecting dust from the gas containing the fine particles separated by the separating means.

With this invention, since dust in the bled gas containing fine particles is collected by using a wet dust collector, collected slurry can be supplied to a water treatment/desalination apparatus as it is, which eliminates a rinsing apparatus conventionally used in desalting process of chlorine bypass dust, resulting in reduced equipment cost. Solvent used for the wet collection is liquefied substance such as water and slurry containing water, which is able to collect dust and the like in the bled gas. In addition to the above, with the present invention, the cooling of the bled gas and the collection of the chlorine bypass dust are simultaneously carried out by the wet dust collector, which eliminates conventionally installed cooler and hot bag filter, and a large scale storage facility, which is conventionally required for chlorine bypass dust with low specific gravity, resulting in remarkably reduced equipment cost. Further, sulfur dioxide (SO2) in the combustion gas is desulfurized in such a manner that the sulfur dioxide (SO2) reacts with calcium hydroxide (Ca(OH)2), which is generated when calcium oxide (CaO) in the fine particles of the dust of the bled gas reacts with water, to be gypsum. Then, the gypsum is discharged out of the cement kiln system, and is effectively utilized in cement mill.

As the separating means, a classifier can be used and cut size thereof is preferably changeable. Adjusting the cut size of the classifier allows the concentration of CaO contained in the fine particles to be controlled, which can control pH of the circulating liquid in the circulating liquid tank, and can control the desulfurizing efficiency by increasing the quantity of the Ca(OH)2 as absorber for sulfur. As the classifier, dry classifiers such as gravity classifier including sedimentation room, inertia classifier including V-type and zigzag type, centrifugal classifier including air-swirling type and rotating vane type, mechanical sieve including vibrating sieve, sonic sieve and air dispersion type, etc.

As the above separating means, a cyclone can be used, and inlet velocity thereof is preferably changeable. Adjusting the cut size by changing the cyclone inlet velocity allows the concentration of CaO contained in the fine particles to be controlled, which can control pH of the circulating liquid in the circulating liquid tank, and can control the desulfurizing efficiency by increasing the quantity of the Ca(OH)2 as absorber for sulfur. Changing the position of a guide vane, changing the number of cyclones installed or the like can change the inlet velocity.

Further, as the wet dust collector, a mixing scrubber may be used. The mixing scrubber is an apparatus characterized in that in a cylindrical body, plurality of guide vanes are installed to swirl a flow in the process that gas and liquid move with concurrently or countercurrently. This mixing scrubber is used to contact the gas and liquid with each other for reaction with each other, collection of collect dust, and the like. The flows of the gas and liquid are preferably concurrent flow, and guide vanes for swirling the flow clockwise and guide vanes for swirling the flow clockwise are installed one after the other.

The mixing scrubber is preferably provided with a circulating liquid tank to which dust slurry collected by the mixing scrubber is supplied and a circulating system by which a part of the dust slurry in the circulating liquid tank is returned to the mixing scrubber. Circulating the dust slurry to the mixing scrubber allows the circulating ratio of the dust slurry to be controlled, which makes it possible to adjust the collection efficiency of the mixing scrubber with ease. In addition to the above, stable operations of brine concentrating apparatus and crystallization apparatus in downstream wastewater treatment/desalination apparatus can be secured.

It is preferable to install a sulfuric acid supplier for supplying sulfuric acid to the circulating liquid tank. With this, when pH of the circulating liquid in the circulating liquid tank excessively increases, sulfuric acid is added to the circulating liquid tank from the sulfuric acid supplier to control the pH of the circulating liquid in the circulating liquid tank below 7, preferably between 4 and 6, which allows generated calcium carbonate to be converted to gypsum. As a result, trouble caused by scale in the passage of circulating slurry supplied to the mixing scrubber can be prevented.

Further, the present invention relates to a method of treating a combustion gas exhausted from a cement kiln, and is characterized in that the method comprises: bleeding a kiln exhaust gas passage, which runs from an end of a cement kiln to a bottom cyclone, of a part of the combustion gas; separating coarse particles in dust in the bled gas; collecting dust from the gas containing fine particles by a wet dust collector with a solvent.

With this method according to the present invention, as described above, a rinsing apparatus conventionally used in desalting process of chlorine bypass dust becomes unnecessary, which reduces equipment cost. And, the cooling of the bled gas and the collection of the chlorine bypass dust are simultaneously carried out by the wet dust collector, which eliminates conventionally installed cooler, hot bag filter, and a large scale storage facility, which is conventionally required for chlorine bypass dust with low specific gravity, resulting in remarkably reduced equipment cost.

At least a part of the dust slurry collected by the wet dust collector may be added to a cement mill system. With this, in the cement mill system, collected dust slurry can be treated while effectively utilizing gypsum generated at the treatment of the exhaust gas.

Further, it is possible to separate dust slurry collected by the wet dust collector into solid and liquid and to add desalted dust cake to a cement mill system. With this, dust slurry collected by the wet dust collector is separated into solid and liquid, and desalted dust cake, from which brine is removed, is added to a cement mill system, which allows the dust cake including gypsum also to effectively be utilized.

Further more, the dust slurry collected by the wet dust collector can be separated into solid and liquid, and at least a part of separated brine may be added to a cement mill system. With this, at least a part of separated brine that is separated from the collected dust slurry can be treated in the cement mill system.

Still further, it is possible that the dust slurry collected by the wet dust collector is separated into solid and liquid; separated brine is desalted in salt recovery process to recover industry salt; and treated water after desalting is utilized again as washing water for washing after the solid/liquid separation or/and water for collection at the wet dust collector. With this method, industry salt can be recovered from brine separated from the collected dust slurry, and water is utilized through circulation between water treatment/desalination apparatus and the solid/liquid separator or/and the wet dust collector, which allows the water discharged to be reduced as much as possible, contributing to the effective use of water.

BRIEF EXPLANATION OF DRAWINGS

FIG. 3 is a graph showing particle distribution of a cement raw material containing CaO in fine particles, which are not collected by a cyclone, and fine particles containing KCl and the like.

THE BEST MODE TO CARRY OUT THE INVENTION

Figure 1:
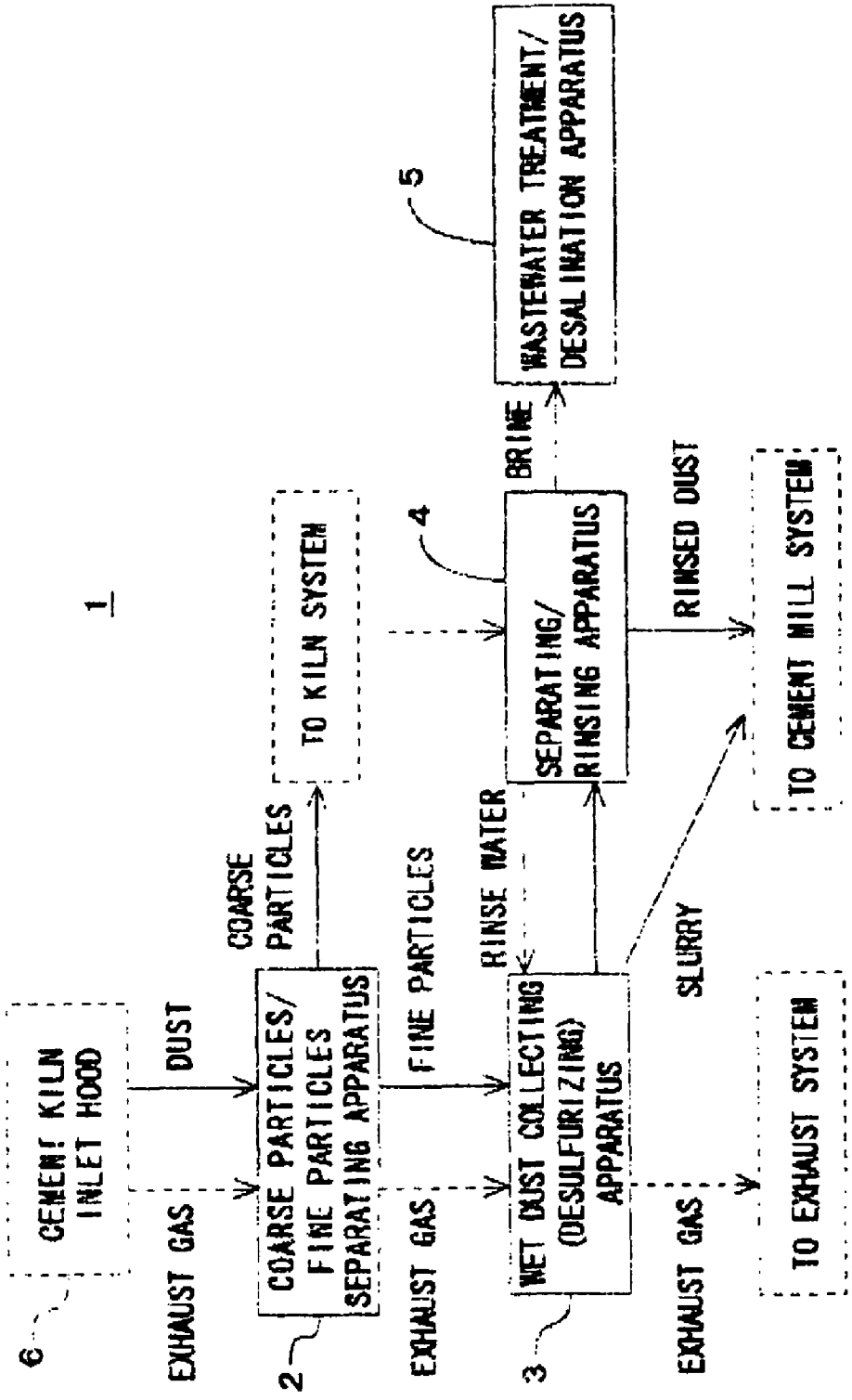
FIG. 1 is a flowchart showing an embodiment according to a cement kiln chlorine/sulfur bypass system of the present invention.

FIG. 1 shows an embodiment of the cement kiln chlorine/sulfur bypass system according to the present invention, and the system 1 comprises a coarse particles/fine particles separating apparatus 2 such as a cyclone, a wet dust collector 3 preferably including a mixing scrubber, a venturi scrubber, or the like, a separating/rinsing apparatus 4 such as filtering/rinsing apparatus and centrifugal separator, and water treatment/desalination apparatus 5.

The gas bled at a position near a cement kiln inlet hood 6 is cooled in a probe not shown with cooling air from a cooling fan and is introduced to the coarse particles/fine particles separating apparatus 2, where the gas is separated into coarse particles and gas containing fine particles. The wet dust collector 3 with solvent collects dust of the gas containing the fine particles. Dust slurry collected by the wet dust collector 3, which includes chlorine composition or compound such as KCl can directly be added to a cement mill system by the range that does not exceed the upper limit of chlorine content of cement that is prescribed in industrial standard or guarantee value on quality. The separating/rinsing apparatus 4 desalts remaining slurry, and dust cake desalted is added to the cement mill system. As a result, the desalted dust cake including gypsum also can effectively be utilized. In addition, the separating/rinsing apparatus 4 may wash all of the dust slurry collected by the wet dust collector 3, and desalted dust cake may be added to the cement mill system.

Further, brine from the separating/rinsing apparatus 4 is supplied to the water treatment/desalination apparatus 5 to recover industry salt, and drainage can be used at the wet dust collector 3 and the separating/rinsing apparatus 4 by circulating it. In addition, brine from the separating/rinsing apparatus 4 is, as generally known, to be discharged after harmful thing including heavy metal is removed by drainage processing.

On the other hand, calcium hydroxide (Ca(OH)2) that is generated when calcium oxide (CaO) in the fine particles reacts with water exists in the dust slurry collected by the wet dust collector 3. Therefore, sulfur composition or compound (SO2) contained in the bled gas from the cement kiln inlet hood 6 reacts with the above calcium hydroxide, and desulfulized in accordance with the below reaction to recover gypsum.

$$CaO+H_2O \rightarrow Ca(OH)_2$$

$$SO_2+Ca(OH)_2 \rightarrow Ca(OH)_2 \rightarrow CaSO_3 \cdot \tfrac{1}{2}H_2O + \tfrac{1}{2}H_2O$$

$$CaSO_3 \cdot \tfrac{1}{2}H_2O + \tfrac{1}{2}O_2 + \tfrac{3}{2}H_2O \rightarrow CaSO_4 \cdot 2H_2O$$

In addition, chlorine component including KCl may be recovered as industry salt as described above, or it is possible to treat the departed brine by feeding it to a cement mill system beside a cement kiln as it is by the range that does not exceed the upper limit of the chlorine content of cement, that is, 200 ppm.

Further, in the above embodiment, calcium hydroxide, which is generated by the reaction of calcium oxide and water in the dust slurry collected by the wet dust collector 3, is utilized, but, as calcium hydroxide source, it is possible to use a material that is generated by the reaction of a part or all of the coarse particles, which are separated from gas bled from kiln exhaust gas passage running from an end of a cement kiln to a bottom cyclone, and water, a material generated by the reaction of calcined raw material to cement kiln and water, or calcium hydroxide and calcium oxide brought from outside.

Figure 2:
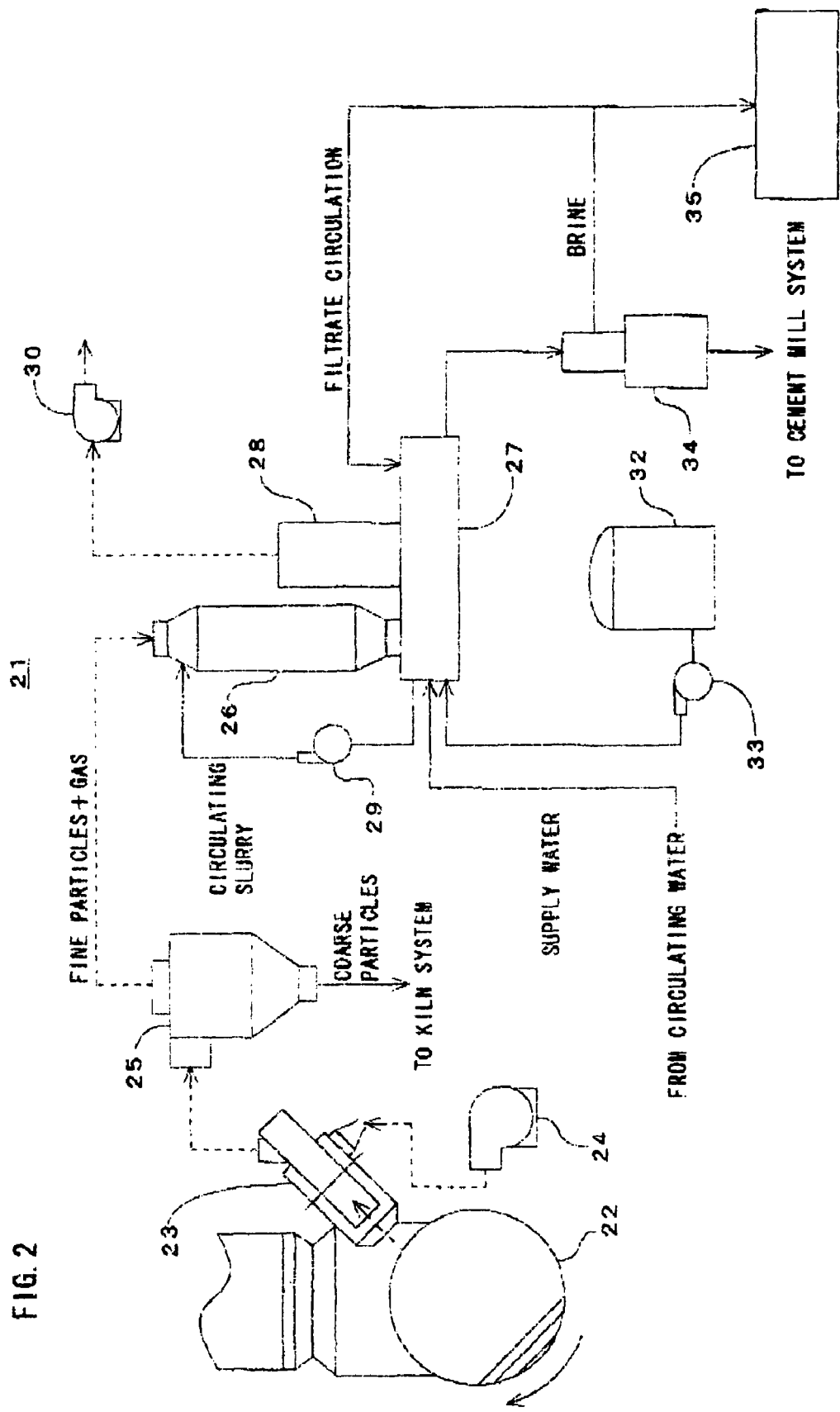
FIG. 2 is a flowchart showing an embodiment according to a cement kiln chlorine/sulfur bypass system of the present invention, in which a mixing scrubber is used as a wet dust collector.

Next, an embodiment of the cement kiln chlorine/sulfur bypass system according to the present invention, in which mixing scrubber 26 (Mu scrubber manufactured by MU COMPANY LTD. etc.) is used as the wet dust collector 3, will be explained with reference to FIG. 2.

The cement kiln chlorine/sulfur bypass system 21 of the present embodiment mainly comprises a cyclone 25 as coarse particles/fine particles separating apparatus, a mixing scrubber 26, a circulating liquid tank 27, a washing tower 28, separating/rinsing apparatus 34 and a wastewater treatment/desalination apparatus 35. Between the mixing scrubber 26 and the circulating liquid tank 27 is mounted a pump 29 for circulating the slurry. In addition, in order to supply sulfuric acid to the circulating liquid tank 27 for adjustment of pH of the circulating slurry, a sulfuric acid tank 32 and a pump 33 are installed.

The gas bled from a kiln exhaust gas passage running from an end of a cement kiln 22 to a bottom cyclone is cooled in a probe 23 with cooling air from a cooling fan 24 and is introduced to the cyclone 25, where the gas is separated into coarse particles and gas containing fine particles. Dust of the gas containing the fine particles is, in the mixing scrubber 26, cooled with water and the like contained in the slurry fed from the circulating liquid tank 27, and the fine particles are collected by the mixing scrubber 26. The superficial velocity V (m/s) of the mixing scrubber 26 is preferably $2 \leq V \leq 8$.

The gas extracted from the mixing scrubber 26 is discharged to an atmosphere through the circulating liquid tank 27, the washing tower 28 and the fan 30, so that the dust collecting efficiency of the mixing scrubber 26 is required to increase. So, the circulating liquid of the mixing scrubber 26 is increased such that the dust content of the exhaust gas, which is discharged to an atmosphere, becomes lower than a predetermined permission value. When the dust content of the exhaust gas is lower than the predetermined permission value, the quantity of the circulating liquid is controlled so as to gradually be decreased to reduce the pressure loss and the consumed power of the mixing scrubber 26. The ratio γ (l/m3) of the quantities of the circulating liquid and the exhaust gas is preferably $15 \leq \gamma \leq 45$.

Further, the concentration of the salt in the circulating slurry of the mixing scrubber 26 is preferably controlled in a prescribed range for the operation of a brine concentrator and a crystallizing apparatus in downstream wastewater treatment/desalination apparatus 35. Therefore, the quantity of slurry discharged is adjusted and the quantity of supply water added is adjusted while observing the salt concentration in the circulating liquid tank 27.

Further, the collected dust slurry including chlorine composition or compound such as KCl that is collected by the mixing scrubber 26 is introduced to the separating/rinsing apparatus 34 through the circulating liquid tank 27, and is separated into cake and brine in the separating/rinsing apparatus 34, and the desalted dust cake is added to a cement mill system. With this operation, the desalted dust cake including gypsum can be utilized effectively. In addition, the brine from the separating/rinsing apparatus 34 is supplied to the wastewater treatment/desalination apparatus 35 to recover industry salt. When salt with especially high concentration is to be obtained or the like, a part of the brine discharged from the separating/rinsing apparatus 34 may be returned to the circulating liquid tank 27 for circulation.

On the other hand, as described above, in the dust slurry collected by the mixing scrubber 26, calcium hydroxide (Ca(OH)2) that is generated when calcium oxide (CaO) in the fine particles reacts with water exists, so that SO2 contained in the gas bled from the inlet hood of the cement kiln reacts with the Ca(OH)2, and is desulfulized in accordance with the below reaction to recover gypsum.

$$CaO+H_2O \rightarrow Ca(OH)_2$$

$$SO_2+Ca(OH)_2 \rightarrow Ca(OH)_2 \rightarrow CaSO_3 \cdot \tfrac{1}{2}H_2O + \tfrac{1}{2}H_2O$$

$$CaSO_3 \cdot \tfrac{1}{2}H_2O + \tfrac{1}{2}O_2 + \tfrac{3}{2}H_2O \rightarrow CaSO_4 \cdot 2H_2O$$

Here, the effect that the sulfur contained in the bled gas is removed is confirmed by observing the concentration of sulfur in the exhaust gas. When the efficiency of the removal of sulfur tends to decrease, absorbent should be added. In order to increase the quantity of Ca(OH)2 as the absorbent, the following operation is adopted.

Figure 3:
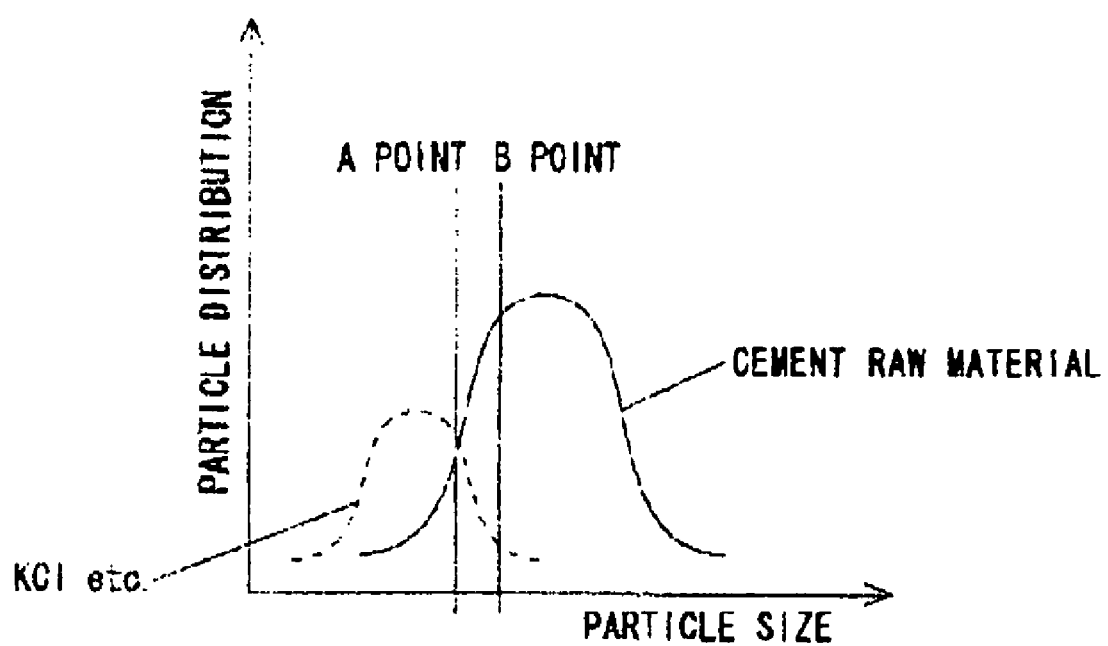

The particle distributions of the raw material including CaO in the fine particles, which are not collected by the cyclone 25, and the fine particles including KCl and the like are shown in FIG. 3. So, to increase the quantity of the CaO functioning as the absorbent, the cut size of the cyclone 25 is shifted, for instance, from A point to B point. With this operation, CaO content of the fine particles, which are discharged from the cyclone 25, increase, which increases the quantity of the absorbent.

The cut particle size of the cyclone 25 is determined by the following formula. Here, Do is cut particle size [cm]; μ is fluid viscosity [poise]; ρs is dust specific gravity [g/cm3], ρf is fluid specific gravity [g/cm3]; Vi is inlet velocity [cm/sec]; d0 is diameter of outlet duct [cm]; and H is height of cyclone hopper portion [cm]. Therefore, when changing the cut point of the cyclone 25, reducing the inlet velocity Vi, reducing the height H of the cyclone hopper portion, or reducing diameter do of the outlet duct causes the cut particle size D0 to be increased, but actually, it is difficult to change the height H of the cyclone hopper portion and diameter do of the outlet duct, so that it is a realistic policy that the inlet velocity Vi is adjusted by changing the position of a guide vane and changing number of cyclones.

$$D_0 = \left\{ \frac{18\mu}{\pi(\rho_s - \rho_f)V_i} \right\}^{1/2} \cdot \frac{d_0}{2 \cdot 26\sqrt{H}}$$

On the other hand, in order to prevent troubles caused by scale in the passage of the circulation slurry that is supplied to the mixing scrubber 26, it is necessary to control pH of the circulating liquid in the circulating liquid tank 27 approximately between 4 and 6. Therefore, when pH of the circulating liquid in the circulating liquid tank 27 excessively increases, as described above, the cut size of the cyclone 25 is changed to reduce the CaO content of the fine particles to solve the problem. In addition, as occasion demands, sulfuric acid stored in the sulfuric acid tank 32 may be added to the circulating liquid tank 27 through the pump 33.

As stated above, with the cement kiln chlorine/sulfur bypass system according to the present invention, equipment cost for desalting and treating chlorine bypass dust can be suppressed; the sulfur composition or compound included in a combustion gas bled from a cement kiln is removed and effectively utilized, and so on.

EXPLANATION OF SYMBOLS

1:cement kiln chlorine/sulfur bypass system
2:coarse particles/fine particles separating apparatus
3: wet dust collector
4:separating/rinsing apparatus
5: water treatment/desalination apparatus
6:cement kiln inlet hood
21:treating apparatus
22:cement kiln
23:probe
24:cooling fan
25:cyclone
26:mixing scrubber
27:circulating liquid tank
28:washing tower
29:pump
30:fan
32:sulfuric acid tank
33:pump
34:separating/rinsing apparatus
35:wastewater treatment/desalination apparatus

The invention claimed is:

1. A cement kiln chlorine/sulfur bypass system for use with a cement kiln which produces a kiln exhaust including exhaust gas and exhaust dust, the system comprising:
an air bleed means for bleeding a kiln exhaust gas passage, which runs from an end of a cement kiln to a bottom cyclone, of a part of a combustion gas including calcium oxide (CaO) and sulfur dioxide ($SO_2$), the air bleed means receiving the kiln exhaust from the cement kiln;
a separating means for separating dust in the gas bled by the air bleed means into coarse particles and fine particles; and
a wet dust collector receiving the fine particles and exhaust gas from the separating means, the wet dust collector being configured to separate the fine particles from the gas, the wet dust collector further being configured to generate calcium hydroxide ($Ca(OH)_2$) from the calcium oxide (CaO) in the fine particles and the water from the wet dust collector, and to allow sulfur dioxide ($SO_2$) to react with the calcium hydroxide ($Ca(OH)_2$) to remove sulfur from the bled gas.

2. The cement kiln chlorine/sulfur bypass system as claimed in claim 1, wherein said separating means includes a classifier in which cut size is changeable.

3. The cement kiln chlorine/sulfur bypass system as claimed in claim 1, wherein said separating means includes a cyclone in which inlet gas velocity is changeable.

4. The cement kiln chlorine/sulfur bypass system as claimed in claim 1, wherein said wet dust collector is a mixing scrubber.

5. The cement kiln chlorine/sulfur bypass system as claimed in claim 4, wherein said mixing scrubber comprises a circulating liquid tank to which a dust slurry collected by the mixing scrubber is supplied and a circulating system by which a part of the dust slurry in the circulating liquid tank is returned to the mixing scrubber.

6. The cement kiln chlorine/sulfur bypass system as claimed in claim 5, further comprising a sulfuric acid supplier for supplying sulfuric acid to the circulating liquid tank.

7. A method of treating a combustion gas exhausted from a cement kiln, the combustion gas including a dust, the method comprising:
bleeding a kiln exhaust gas passage, which runs from an end of a cement kiln to a bottom cyclone, of a part of the combustion gas including calcium oxide (CaO) and sulfur dioxide ($SO_2$);
separating coarse particles in dust in the bled gas;
collecting dust from the gas containing fine particles by a wet dust collector with a solvent;
generating calcium hydroxide ($Ca(OH)_2$) from the calcium oxide (CaO) in the fine particles and the solvent from the wet dust collector; and
removing sulfur from the bled gas by allowing sulfur dioxide ($SO_2$) to react with the calcium hydroxide ($Ca(OH)_2$).

8. The method of treating combustion gas exhausted from a cement kiln as claimed in claim 7, wherein at least a part of said dust slurry collected by the wet dust collector is added to a cement mill system.

9. The method of treating combustion gas exhausted from a cement kiln as claimed in claim 7, wherein said dust slurry collected by the wet dust collector is separated into solid and liquid and a desalted dust cake is added to a cement mill system.

10. The method of treating combustion gas exhausted from a cement kiln as claimed in claim 7, wherein said dust slurry collected by the wet dust collector is separated into solid and liquid, and at least a part of separated brine is added to a cement mill system.

11. The method of treating combustion gas exhausted from a cement kiln as claimed in claim 7, wherein said dust slurry collected by the wet dust collector is separated into solid and liquid; separated brine is desalted in salt recovery process to recover industry salt; and treated water after desalting is utilized again as washing water for washing after the solid/liquid separation or/and water for collection at the wet dust collector.

12. A cement kiln chlorine/sulfur bypass system for use with a cement kiln which produces a kiln exhaust including exhaust gas and exhaust particles, each particle defining a particle size, the system comprising:
an air bleed means for bleeding a kiln exhaust gas passage, which runs from an end of a cement kiln to a bottom cyclone, of a part of a combustion gas including calcium oxide (CaO) and sulfur dioxide ($SO_2$), the air bleed means receiving the kiln exhaust from the cement kiln;

a circulating liquid tank having a fluid stored therein, the fluid defining a fluid pH;

an adjustable separating means in fluid communication with the circulating liquid tank and the air bleed means, the separating means being configured to receive the kiln exhaust and to define a cut point which is adjustable to control the fluid pH, wherein the fluid pH decreases as the cut point increases and the fluid pH increases as the cut point decreases; and a wet dust collector in fluid communication with the adjustable separating means and the circulating liquid tank, the wet dust collector receiving the fine particles and exhaust gas from the separating means, the wet dust collector being configured to separate the fine particles from the gas, the wet dust collector further being configured to generate calcium hydroxide ($Ca(OH)_2$) from the calcium oxide (CaO) in the fine particles and the water from the wet dust collector, and to allow sulfur dioxide ($SO_2$) to react with the calcium hydroxide ($Ca(OH)_2$) to remove sulfur from the bled gas.

13. The cement kiln chlorine/sulfur bypass system as claimed in claim 1, wherein the wet dust collector is configured to reduce the temperature of the gas.

* * * * *